(12) United States Patent
Quan

(10) Patent No.: US 10,779,204 B2
(45) Date of Patent: Sep. 15, 2020

(54) METHOD AND DEVICE FOR PERFORMING DATA TRANSMISSION

(71) Applicant: China Academy of Telecommunications Technology, Beijing (CN)

(72) Inventor: Haiyang Quan, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 45 days.

(21) Appl. No.: 16/300,582

(22) PCT Filed: Apr. 28, 2017

(86) PCT No.: PCT/CN2017/082402
§ 371 (c)(1),
(2) Date: Nov. 12, 2018

(87) PCT Pub. No.: WO2017/193825
PCT Pub. Date: Nov. 16, 2017

(65) Prior Publication Data
US 2019/0215739 A1 Jul. 11, 2019

(30) Foreign Application Priority Data
May 12, 2016 (CN) .......................... 2016 1 0319009

(51) Int. Cl.
*H04W 36/00* (2009.01)
*H04W 36/08* (2009.01)
(Continued)

(52) U.S. Cl.
CPC ....... *H04W 36/0072* (2013.01); *H04L 5/0053* (2013.01); *H04W 36/08* (2013.01);
(Continued)

(58) Field of Classification Search
CPC ................................................ H04W 36/0072
See application file for complete search history.

(56) References Cited

U.S. PATENT DOCUMENTS

2012/0243417 A1 9/2012 Henttonen et al.
2013/0039287 A1* 2/2013 Rayavarapu .......... H04W 76/28
370/329
(Continued)

FOREIGN PATENT DOCUMENTS

CN 101043714 A 9/2007
CN 101355604 A 1/2009
(Continued)

OTHER PUBLICATIONS

Sophia Antipolis, "Updates to solution 6.3.2", Ericsson, SA WG2 Meeting #114, S2-161762, France, Apr. 11-15, 2016, 4 pages.
(Continued)

*Primary Examiner* — Kodzovi Acolatse
*Assistant Examiner* — Abdeltif Ajid
(74) *Attorney, Agent, or Firm* — Kilpatrick Townsend & Stockton, LLP

(57) ABSTRACT

Provided are a method and device for performing data transmission capable of solving a problem in the prior art in which if a user equipment unit needs to perform transmission with a network, the user equipment unit needs to perform a cell switching process to enter another cell, and this results in higher signaling overheads for a terminal. In an embodiment of the invention, a new connected state is different from an idle state and a connected state. In the new connected state, a terminal can perform data transmission with a network side device. Moreover, after the terminal has moved to a coverage of another cell from a coverage of a cell
(Continued)

currently accessed by it, the terminal can move to the new cell by means of cell reselection without performing a cell switching process.

16 Claims, 5 Drawing Sheets

(51) Int. Cl.
*H04L 5/00* (2006.01)
*H04W 52/02* (2009.01)
*H04W 68/02* (2009.01)
*H04W 72/04* (2009.01)
*H04W 74/08* (2009.01)

(52) U.S. Cl.
CPC ... *H04W 52/0216* (2013.01); *H04W 52/0229* (2013.01); *H04W 68/02* (2013.01); *H04W 72/048* (2013.01); *H04W 74/0833* (2013.01)

(56) References Cited

U.S. PATENT DOCUMENTS

| | | | |
|---|---|---|---|
| 2014/0321371 A1* | 10/2014 | Anderson | H04W 72/042 370/329 |
| 2015/0045020 A1 | 2/2015 | Wang et al. | |
| 2015/0312960 A1 | 10/2015 | Kim et al. | |

FOREIGN PATENT DOCUMENTS

| | | |
|---|---|---|
| CN | 101483897 A | 7/2009 |
| CN | 104205903 A | 12/2014 |
| WO | 2014014217 A1 | 1/2014 |
| WO | 2015172749 A1 | 11/2015 |

OTHER PUBLICATIONS

Ericsson, "Handling of inactive UEs", 3GPP TSG-RAN WG2 #93bis, Tdoc R2-162160, Dubrovnik, Croatia, Apr. 11-15, 2016, 6 pages.

* cited by examiner

METHOD AND DEVICE FOR PERFORMING DATA TRANSMISSION

This application is a National Stage of International Application No. PCT/CN2017/082402, filed Apr. 28, 2017, which claims priority to Chinese Patent Application No. 201610319009.8, filed May 12, 2016, both of which are hereby incorporated by reference in their entireties.

TECHNICAL FIELD

The present invention relates to the field of wireless communications, and particularly to a method and device for transmitting data.

BACKGROUND

There are two states of a User Equipment (UE) in an existing 4G system: a Radio Resource Control (RRC)_CONNECTED state and a RRC_IDLE state.

The UE can perform the following operations in the RRC_IDLE state.

Public Land Mobile Network (PLMN) selection; Non-Access Stratum (NAS) configured Discontinuous Reception (DRX); System information broadcast; Paging; Mobility of a cell reselection mode; the UE is allocated an identifier unique in a specific tracking area; an Evolved Node B (eNB) does not store a context of the UE: transmission and reception in side-link communication during Device to Device (D2D) communication; notification and monitoring in a side-link discovery during a D2D discovery; etc.

The UE can perform the following operations in the RRC_CONNECTED state.

Adjacent cell measurement; D2D communication; a D2D discovery; the UE transmits and receives data with a network: the UE monitors a control signaling channel of a shared data channel to detect the shared data channel for transmission allocated for the UE; the UE reports channel quality information and makes feedback to the eNB; etc.

At present, the UE can transmit and receive user data with the network only after the UE enters an active state, and a cell switching procedure shall be performed when the UE in the active state enters another cell while moving; and since a lot of signaling has to be exchanged in the cell switching procedure, there will be a significant signaling overhead of the UE in the procedure.

In summary, a drawback in the prior art lies in that if the UE needs to transmit with the network, then a cell switching procedure will be performed before the UE enters another cell, thus resulting in a significant signaling overhead of the UE.

SUMMARY

The invention provides a method and device for transmitting data so as to address a problem in the prior art that if a UE needs to transmit with a network, then a cell switching procedure will be performed before the UE enters another cell, thus resulting in a significant signaling overhead of the UE.

At least one embodiment of the invention provides a method for transmitting data, the method including: determining, by a UE, that a network-side device configures the UE into a new active state, where the UE in the new active state moves to a new cell through cell reselection: and transmitting, by the UE, data with the network-side device in the new active state.

Optionally, transmitting, by the UE, the data with the network-side device in the new active state includes: transmitting, by the UE, the data with the network-side device in the new active state according to a UE identifier in the new active state configured by the network-side device.

Optionally, transmitting, by the UE, the data with the network-side device in the new active state includes: transmitting, by the UE, the data with the network-side device in the new active state in an active area of the new active state.

Optionally, after the UE determines that the network-side device configures the UE into the new active state, the method further includes: initiating, by the UE, a random access procedure after the UE moves out of the active area, and transmitting the UE identifier to a currently accessed network-side device in the random access procedure, so that the currently accessed network-side device configures the UE into the new active state.

Optionally, transmitting, by the UE, the data with the network-side device in the new active state includes: transmitting, by the UE, the data to the network-side device over a common resource and/or a contention channel; and receiving, by the UE, data transmitted by the network-side device at least by one of following operations: receiving, by the UE, the data transmitted by the network-side device over the common resource; receiving, by the UE, the data transmitted by the network-side device in a paging message; or receiving, by the UE, the data transmitted by the network-side device at a Discrete Reception, DRX, periodicity in the new active state.

Optionally, after the UE transmits the data to the network-side device over the common resource and/or the contention channel, the method further includes: transmitting, by the UE, the data to the network-side device over the common resource and/or the contention channel again upon determining that the number of retransmissions does not reach a threshold; or monitoring, by the UE, a feedback channel after waiting for a preset length of time, and transmitting the data to the network-side device over the common resource and/or the contention channel again upon determining that the network-side device has failed to receive the data.

At least one embodiment of the invention provides another method for transmitting data, the method including: configuring, by a network-side device, a UE into a new active state upon determining that the UE needs to enter the new active state, where the UE in the new active state moves to a new cell through cell reselection; and transmitting, by the network-side device, the data with the UE in the new active state.

Optionally, configuring, by the network-side device, the UE into the new active state includes: configuring, by the network-side device, the UE with a UE identifier in the new active state; and transmitting, by the network-side device, the data with the UE in the new active state includes: transmitting, by the network-side device, the data with the UE in the new active state according to the UE identifier.

Optionally, before the network-side device configures the UE into the new active state, the method further includes: determining, by the network-side device, that the UE has moved out of an active area in the new active state.

Optionally, determining, by the network-side device, that the UE has moved out of the active area in the new active state includes: determining, by the network-side device, that the UE has moved out of the active area in the new active state upon reception of a UE identifier of the UE lastly operating in the new active state in a random access procedure with the UE: and configuring, by the network-side device, the UE into the new active state includes: obtaining, by the network-side device, a context of the UE according to the UE identifier of the UE lastly operating in the new active state; and configuring, by the network-side device, the UE into the new active state according to the context of the UE.

Optionally, configuring, by the network-side device, the UE into the new active state further includes: configuring, by the network-side device, the UE with the active area in the new active state.

Optionally, the active area is controlled by a plurality of network-side devices; and after the network-side device configures the UE into the new active state, the method further includes: notifying, by the network-side device, the other network-side devices in the active area of the UE identifier of the UE in the new active state, and/or a route of the UE.

Optionally, before the network-side device configures the UE into the new active state, the method further includes: determining, by the network-side device, that the UE is an inactive UE.

Optionally, transmitting, by the network-side device, the data with the UE in the new active state includes: receiving, by the network-side device, the data transmitted by the UE over a common resource and/or a contention channel; and transmitting, by the network-side device, the data to the UE at least by one of following operations: transmitting, by the network-side device, the data to the UE over the common resource; transmitting, by the network-side device, the data to the UE in a paging message; or transmitting, by the network-side device, the data to the UE at a DRX periodicity in the new active state.

Optionally, configuring, by the network-side device, the UE into the new active state further includes: if the network-side device receives the data transmitted by the UE over the common resource, then configuring, by the network-side device, the UE with the common resource; and/or if the network-side device transmits the data to the UE at the DRX periodicity in the new active state, then configuring, by the network-side device, the UE with the DRX periodicity in the new active state.

At least one embodiment of the invention provides a UE for transmitting data, the UE including: a determining module configured to determine that a network-side device configures the UE into a new active state, where the UE in the new active state moves to a new cell through cell reselection; and a first transmitting module configured to transmit data with the network-side device in the new active state.

Optionally, the first transmitting module is configured to transmit the data with the network-side device in the new active state according to a UE identifier in the new active state configured by the network-side device.

Optionally, the first transmitting module is configured to transmit the data with the network-side device in the new active state in an active area of the new active state.

Optionally, the first transmitting module is further configured to initiate a random access procedure after the UE moves out of the active area, and to transmit the UE identifier to a currently accessed network-side device in the random access procedure, so that the currently accessed network-side device configures the UE into the new active state.

Optionally, the first transmitting module is configured to transmit data to the network-side device over a common resource and/or a contention channel; and to receive data transmitted by the network-side device at least by one of following operations: receiving the data transmitted by the network-side device over the common resource: receiving the data transmitted by the network-side device in a paging message: or receiving the data transmitted by the network-side device at a Discrete Reception (DRX) periodicity in the new active state.

Optionally, the first transmitting module is further configured: after the data are transmitted to the network-side device over the common resource and/or the contention channel, to transmit the data to the network-side device over the common resource and/or the contention channel again upon determining that the number of retransmissions does not reach a threshold; or to monitor a feedback channel after waiting for a preset length of time, and to transmit the data to the network-side device over the common resource and/or the contention channel again upon determining that the network-side device has failed to receive the data.

At least one embodiment of the invention provides a network-side device for transmitting data, the network-side device including: a configuring module configured to configure a UE into a new active state upon determining that the UE needs to enter the new active state, where the UE in the new active state moves to a new cell through cell reselection; and a second transmitting module configured to transmit data with the UE in the new active state.

Optionally, the configuring module is further configured to configure the UE with a UE identifier in the new active state: and the second transmitting module is configured to transmit the data with the UE in the new active state according to the UE identifier.

Optionally, the configuring module is further configured to configure the UE into the new active state upon determining that the UE has moved out of an active area in the new active state.

Optionally, the configuring module is configured to determine that the UE has moved out of the active area in the new active state upon reception of a UE identifier of the UE lastly operating in the new active state in a random access procedure with the UE; and to obtain a context of the UE according to the UE identifier of the UE lastly operating in the new active state, and to configure the UE into the new active state according to the context of the UE.

Optionally, the configuring module is further configured to configure the UE with the active area in the new active state.

Optionally, the active area is controlled by a plurality of network-side devices; and the configuring module is further configured to notify the other network-side devices in the active area of the UE identifier of the network-side device in the new active state, and/or a route of the UE.

Optionally, the configuring module is further configured to configure the UE into the new active state upon determining that the UE is an inactive UE.

Optionally the second transmitting module is configured to receive the data transmitted by the UE over a common resource and/or a contention channel: and to transmit the data to the UE at least by one of following operations: transmitting the data to the UE over the common resource; transmitting the data to the UE in a paging message; or transmitting the data to the UE at a DRX periodicity in the new active state.

Optionally, the configuring module is further configured: if the data transmitted by the UE is received over the common resource, to configure the UE with the common resource; and/or if the data are transmitted to the UE at the DRX periodicity in the new active state, to configure the UE with the DRX periodicity in the new active state.

At least one embodiment of the invention provides a UE including: a processor configured to read programs in a memory to determine that a network-side device configures the UE into a new active state, where the UE in the new active state moves to a new cell through cell reselection; and to transmit data with the network-side device in the new active state through a transceiver; and the transceiver configured to receive and transmit the data under the control of the processor.

At least one embodiment of the invention provides a network-side device including: a processor configured to read programs in a memory to configure a UE into a new active state upon determining that the UE needs to enter the new active state, where the UE in the new active state moves to a new cell through cell reselection; and to transmit data with the UE in the new active state through a transceiver; and the transceiver configured to receive and transmit data under the control of the processor.

The new active state in the embodiments of the invention is a different state from the idle state and the active state: and in this state, the UE can transmit data with the network-side device, and after the UE moves from the currently accessed cell to another cell, the UE moves to the new cell in a cell reselection procedure instead of a cell switching procedure. In this way, when the UE moves to the other cell, the drawback of a significant signaling overhead of the UE in the cell switching procedure can be addressed to thereby lower the signaling overhead.

BRIEF DESCRIPTION OF THE DRAWINGS

In order to make the technical solutions in embodiments of the invention more apparent, the drawings to which reference is to be made in the description of the embodiments will be introduced below in brief, and those ordinarily skilled in the art can further derive from these drawings other drawings without any inventive effort.

DETAILED DESCRIPTION OF THE EMBODIMENTS

In order to make the objects, technical solutions and advantages of the invention more apparent, the invention will be described below in further details with reference to the drawings, and apparently the embodiments described below are only a part but not all of the embodiments of the invention. Based upon the embodiments here of the invention, all the other embodiments which can occur to those ordinarily skilled in the art without any inventive effort shall fall into the claimed scope of the invention.

Figure 1A:
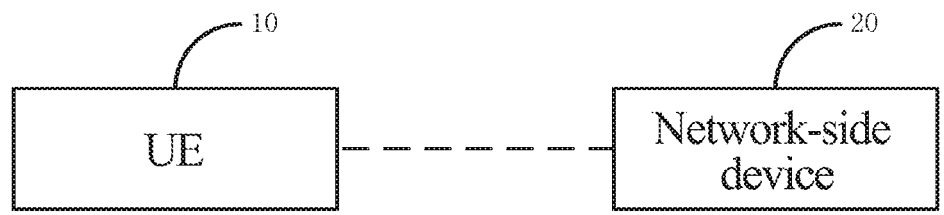
FIG. 1A is a schematic structural diagram of a system for transmitting data according to the embodiments of the invention.

As illustrated in FIG. 1A, a system for transmitting data according to the embodiments of the invention includes following devices.

A UE 10, configured to determine that a network-side device configures the UE into a new active state, and to transmit data with the network-side device in the new active state, where the UE in the new active state moves to a new cell through cell reselection.

The network-side device 20, configured to configure the UE into the new active state upon determining that the UE needs to enter the new active state, and to transmit data with the UE in the new active state: where the UE in the new active state moves to the new cell through cell reselection.

The new active state in the embodiments of the invention is a different state from an idle state and an active state; and in this state, the UE can transmit data with a network-side device in a new cell to which the UE moves, and when the UE moves from a currently accessed cell to another cell, the UE moves to the new cell in a cell reselection procedure instead of a cell switching procedure, that is, the UE selects the new cell as its serving cell. In this way, when the UE moves to another cell, the drawback of a significant signaling overhead of the UE in the cell switching procedure can be addressed to thereby lower the signaling overhead.

In an implementation, the new cell refers to another cell than a currently serving cell, and particularly the UE in the active state typically moves to a target cell (which is a new cell) in a switching procedure, but in this implementation, the UE moves to the target cell through cell reselection, that is, the UE enters another cell than a current cell.

The new cell is not related directly to an active area or a preconfigured area as described below, but defined relative to the currently serving cell. After the active area or the preconfigured area is configured, a subsequent flow will be performed differently dependent upon whether the new cell lies in the area. For example, if the new cell lies in the area, then the network will not be notified; otherwise, the cell may report its position to a network for updating. A particular implementation thereof will be further described in the following implementations.

The new active state can alternatively be denominated otherwise, e.g., an inactive state.

Figure 1B:
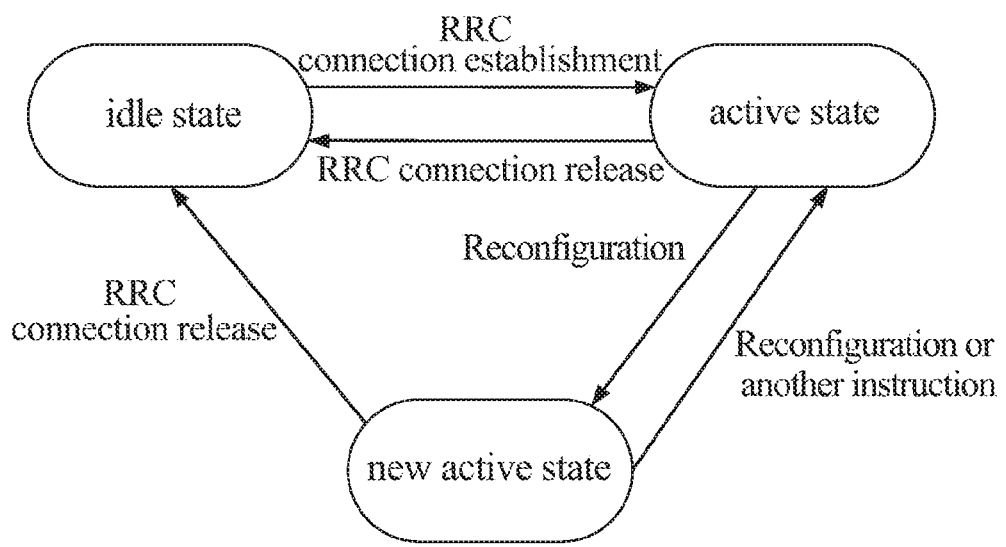
FIG. 1B is a schematic diagram of state transition according to the embodiments of the invention.

Since the new active state is introduced to the embodiments of the invention, the UE can be switched between the new active state, the idle state and the active state in any mode. FIG. 1B illustrates a feasible mode thereof: the UE can be switched from the new active state to the idle state through RRC connection release: the UE can be switched from the new active state to the active state through reconfiguration or another instruction; the UE can be switched from the active state to the new active state through reconfiguration; the UE can be switched from the idle state to the active state through RRC connection establishment; and the UE can be switched from the active state to the idle state through RRC connection release.

In an implementation, if the network-side device determines that the UE is an inactive UE, then the network-side device may configure the UE into the new active state.

Whether the UE is an inactive UE can be determined in a number of ways, and for example, whether the UE is an inactive UE can be determined according to a traffic characteristic of the UE, a device attribute of the UE, or another factor.

Particularly when this is determined according to the traffic characteristic of the UE, for example, if data corresponding to traffic are infrequent small data, that is, the data are discrete, and a packet of small data is transmitted at a long interval of time, then it may be determined that the UE is an inactive UE.

When this is determined according to the traffic characteristic of the UE, for example, if the traffic is Over The Top (OTT) traffic (which is transmitted directly over the top, and generally refers to the traffic to be transmitted discretely back and forth without being controlled by an operator, such as a chat message transmitted in instant communication software, etc.), then it may be determined that the UE is an inactive UE.

When this is determined according to the device attribute, for example, if the UE is a UE with low mobility, or a machine-type UE, or a UE for which low reliability is required, then it may also be determined that the UE is an inactive UE.

The network-side device configuring the UE into the new active state can further configure the UE with a part or all of the following items: an identifier of the UE in the new active state, an active area of the UE in the new active state, a DRX periodicity of the UE in the new active state, a common resource pool accessible to the UE in the new active state, and a contention channel accessible to the UE in the new active state.

Here if the active area of the UE in the new active state is not set, then the active area in the new active state may be configured as an area composed of a cell currently accessed by the UE and N surrounding cells. If the DRX periodicity of the UE in the new active state is not set, then the DRX periodicity in the new active state may be configured. If the common resource pool is not set, then the common resource pool may be configured: and if the contention channel is not set, then the contention channel may be configured.

In an implementation, the identifier of the UE in the new active state can be a UE identifier which can identify the UE uniquely, and particularly can be consisted of an identifier of the network-side device and a temporary identifier of the UE (for example, if the network-side device includes a Central Unit (CU), then the identifier of the UE in the new active state may be in the form of the identifier of the CU plus the temporary identifier of the UE).

Optionally, data transmission of the network-side device with the UE in the new active state includes uplink transmission and downlink transmission.

For the uplink transmission, the UE transmits data to the network-side device over a common resource and/or a contention channel. Correspondingly, the network-side device receives the data transmitted by the UE over the common resource and/or the contention channel.

For example, when the UE transmits the data to the network-side device over the common resource, the UE selects a resource for a current transmission from all common resources; and the network-side device receives the data over the resource for the current transmission, which is selected from all the common resources.

The common resource here can be configured for each cell, or can be shared by a plurality of cells.

In another example, when the UE transmits the data to the network-side device over the contention channel, the UE transmits user data over a contention channel configured by the network-side device, and also carries a user identifier for distinguishing the user data. There may be transmission collision over the contention channel, and at this time, the UE can detect a corresponding feedback channel for its identifier to thereby determine whether the network-side device has received the transmitted data transmitted by the UE.

The UE can transmit the data to the network-side device for a number of times so that it is not necessary for the network-side device to make any feedback. Particularly, the UE transmits the data to the network-side device over the common resource and/or the contention channel again upon determining that the number of retransmissions does not reach a threshold.

The UE transmitting the data to the network-side device can further wait for a period of time, monitor a preconfigured feedback channel, and determine whether the data have been received correctly, after the data are transmitted. Particularly, the UE monitors the feedback channel after waiting for a preset length of time, and can transmit the data to network-side device over the common resource and/or the contention channel again upon determining that the network-side device has failed to receive the data.

For the downlink transmission, the network-side device can transmit data to the UE in at least one of the following implementations: the network-side device transmits the data to the UE over a common resource; the network-side device transmits the data to the UE in a paging message: or the network-side device transmits the data to the UE at the DRX periodicity in the new active state.

Correspondingly, if the network-side device transmits the data to the UE over the common resource, then the UE will receive the data transmitted by the network-side device over the common resource; if the network-side device transmits the data to the UE in the paging message, then the UE will receive the data transmitted by the network-side device in the paging message; and if the network-side device transmits the data to the UE at the DRX periodicity in the new active state, then the UE will receive the data transmitted by the network-side device at the DRX periodicity in the new active state.

For example, the network-side device transmits the data to the UE over the common resource, and the common resource is configured by the network side for the UE and may be a common resource of one or more cells, so the UE receives the downlink data over the corresponding common resource. In order to save electricity, typically a DRX periodicity may be also configured at the same time, and the UE can monitor the common resource whether there are downlink data at the DRX periodicity.

For example, the network-side device transmits the data to the UE in the paging message, so the UE obtains the data in the paging message upon reception of the paging message.

For example, the network-side device transmitting the data to the UE at the DRX periodicity in the new active state can transmit the data to the UE in an awaked period of time in the DRX periodicity: correspondingly the UE receives the data transmitted by the network-side device in the awaked period of time in the DRX periodicity.

Optionally, the UE transmits data with the network-side device in the new active state according to the UE identifier in the new active state configured by the network-side device; and correspondingly the network-side device transmits the data with the UE in the new active state according to the UE identifier.

For example, the UE can carry its UE identifier in the data transmitted to the network-side device: and correspondingly the network-side device knows which UE has transmitted the data, according to the UE identifier.

In another example, the network-side device can carry a UE identifier in the data transmitted to the UE; and correspondingly the UE can know whether the data is data transmitted thereto, according to the UE identifier upon reception of the data of the network-side device.

Optionally, the UE transmits data with the network-side device in the new active state by transmitting data with the network-side device in the active area in the new active state.

If the UE moves out of the active area, then the UE will initiate a random access procedure after it moves out of the active area, and transmit the UE identifier to a currently accessed network-side device in the random access procedure, so that the currently accessed network-side device configures the UE into the new active state. Stated otherwise, the UE needs to enter the active state after it moves out of the active area, and further enters the new active state from the active state; where moving out of the active area refers to moving outside the active area; and the active area may include a plurality of cells, one of the cells is the serving cell, and when the UE moves out of the serving cell, and enters a target cell, the target cell is a new cell of the UE, that is, the new cell may be a cell in the active area or may be a cell outside the active area.

Correspondingly, the network-side device can configure the UE into the new active state upon determining that the UE is an inactive UE, or can configure the UE into the new active state upon determining that the UE in the new active state moves out of the active area in the new active state, where the UE in the new active state can contact a network and update its positional information once it moves out of the active area, and at this time, the network-side can configure the UE into the new active state again, and also configure a new active area.

In an implementation, the network-side device determines that the UE has moved out of the active area in the new active state upon reception of a UE identifier of the UE lastly operating in the new active state in a random access procedure with the UE.

For example, the UE transmits a UE identifier B in the new active state to the network-side device after the UE moves out of an active area A in the new active state, so the UE identifier B is a UE identifier of the UE lastly operating in the new active state.

Here the network-side device obtains a context of the UE according to the UE identifier of the UE lastly operating in the new active state, and configures the UE into the new active state according to the context of the UE.

Particularly, the UE can initiate a positional area update procedure after it moves out of the active area in the new active state, and since the UE moves out of the preconfigured area, and has no resource accessible, the UE needs to initiate a random access procedure in a new cell, and notifies the network-side device of its positional change.

Here the UE identifier of the UE lastly operating in the new active state is carried in a message transmitted by the UE to the network-side device, so that the network-side device obtains a context of the UE from an original network-side device according to the UE identifier. A new network-side device configures the UE, and transmits a positional update acknowledge message or an RRC configuration message to the UE, so the UE resumes the new active state.

Optionally, if the active area in the new active state is controlled by a plurality of network-side devices, and for example, the active area includes M cells controlled by the plurality of network-side devices, then: after the network-side device configures the UE into the new active state, the network-side device can notify the other network-side devices in the active area of the UE identifier of the UE in the new active state and/or a route of the UE.

The UE identifier and/or the route of the UE are/is used by the UE to transmit data in cells where the other network-side devices are located, when the UE moves to the cells.

Optionally, if the active area in the new active state is controlled by a plurality of network-side devices, then the network-side device may further negotiate with the other network-side devices, and determine a resource pool.

If the active area in the new active state is controlled by a plurality of network-side devices, and the network-side device receives data transmitted by a UE which is a UE previously accessing another network-side device, then the network-side device will forward the received data to the other network-side device according to an identifier and/or a route of the UE transmitted by the other network-side device.

Figure 2:
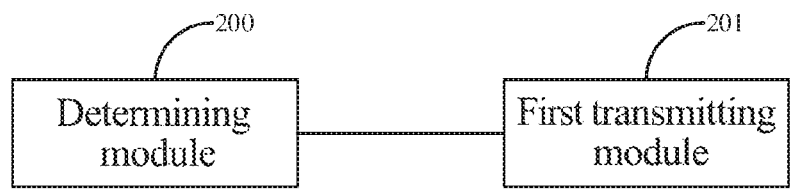
FIG. 2 is a schematic structural diagram of a first UE according to the embodiments of the invention.

As illustrated in FIG. 2, a first UE according to the embodiments of the invention includes: a determining module 200 configured to determine that a network-side device configures the UE into a new active state, where the UE in the new active state moves to a new cell through cell reselection: and a first transmitting module 201 configured to transmit data with the network-side device in the new active state.

Optionally, the first transmitting module 201 is configured to: transmit data with the network-side device in the new active state according to a UE identifier in the new active state configured by the network-side device.

Optionally, the first transmitting module 201 is configured to: transmit data with the network-side device in the new active state in an active area of the new active state.

Optionally, the first transmitting module 201 is further configured to: initiate a random access procedure after the UE moves out of the active area, and transmit the UE identifier to a currently accessed network-side device in the random access procedure, so that the currently accessed network-side device configures the UE into the new active state.

Optionally, the first transmitting module 201 is configured to: transmit data to the network-side device over a common resource and/or a contention channel; and receive data transmitted by the network-side device at least by one of following operations: receiving the data transmitted by the network-side device over the common resource; receiving the data transmitted by the network-side device in a paging message: or receiving the data transmitted by the network-side device at a Discrete Reception (DRX) periodicity in the new active state.

Optionally, the first transmitting module 201 is further configured: after the data are transmitted to the network-side device over the common resource and/or the contention channel, to transmit the data to the network-side device over the common resource and/or the contention channel again upon determining that the number of retransmissions does not reach a threshold; or to monitor a feedback channel after waiting for a preset length of time, and to transmit the data to the network-side device over the common resource and/or the contention channel again upon determining that the network-side device has failed to receive the data.

Figure 3:
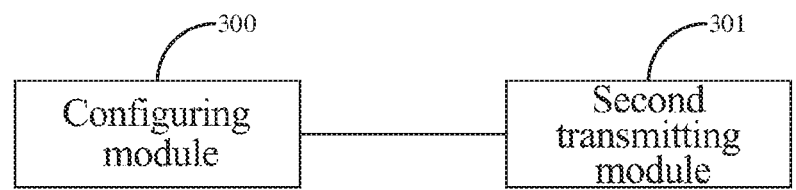
FIG. 3 is a schematic structural diagram of a first network-side device according to the embodiments of the invention.

As illustrated in FIG. 3, a first network-side device according to the embodiments of the invention includes: a configuring module 300, configured to configure a UE into a new active state upon determining that the UE needs to enter the new active state, where the UE in the new active state moves to a new cell through cell reselection; and a second transmitting module 301, configured to transmit data with the UE in the new active state.

Optionally, the configuring module 300 is further configured to configure the UE with a UE identifier in the new active state; and the second transmitting module 301 is configured to transmit the data with the UE in the new active state according to the UE identifier.

Optionally, the configuring module 300 is further configured to: configure the UE into the new active state upon determining that the UE has moved out of an active area in the new active state.

Optionally, the configuring module 300 is configured to: determine that the UE has moved out of the active area in the new active state upon reception of a UE identifier of the UE lastly operating in the new active state in a random access procedure with the UE: and obtain a context of the UE according to the UE identifier of the UE lastly operating in the new active state, and configure the UE into the new active state according to the context of the UE.

Optionally, the configuring module 300 is further configured to configure the UE with the active area in the new active state.

Optionally, the active area is controlled by a plurality of network-side devices; and the configuring module 300 is further configured to: notify the other network-side devices in the active area of the UE identifier of the network-side device in the new active state, and/or a route of the UE.

Optionally, the configuring module 300 is further configured to: configure the UE into the new active state upon determining that the UE is an inactive UE.

Optionally, the second transmitting module 301 is configured to: receive the data transmitted by the UE over a common resource and/or a contention channel; and transmit the data to the UE at least by one of following operations: transmitting the data to the UE over the common resource; transmitting the data to the UE in a paging message: or transmitting the data to the UE at a DRX periodicity in the new active state.

Optionally, the configuring module 300 is further configured: if the data transmitted by the UE is received over the common resource, to configure the UE with the common resource; and/or if the data are transmitted to the UE at the DRX periodicity in the new active state, to configure the UE with the DRX periodicity in the new active state.

Figure 4:
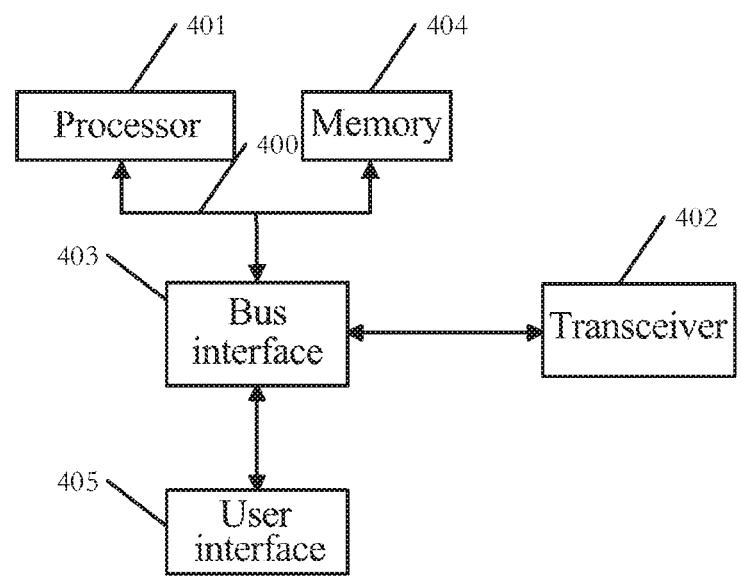
FIG. 4 is a schematic structural diagram of a second UE according to the embodiments of the invention.

As illustrated in FIG. 4, a second UE according to the embodiments of the invention includes following components.

A processor 401, configured to read programs in a memory 404 to: determine that a network-side device configures the UE into a new active state, where the UE in the new active state moves to a new cell through cell reselection; and transmit data with the network-side device in the new active state through a transceiver 402.

The transceiver 402, configured to receive and transmit the data under the control of the processor 401.

Optionally, the processor 401 is configured to: transmit data with the network-side device in the new active state according to a UE identifier in the new active state configured by the network-side device.

Optionally, the processor 401 is configured to: transmit data with the network-side device in the new active state in an active area of the new active state.

Optionally, the processor 401 is further configured to: initiate a random access procedure after the UE moves out of the active area, and transmit the UE identifier to the currently accessed network-side device in the random access procedure, so that the currently accessed network-side device configures the UE into the new active state.

Optionally, the processor 401 is configured to: transmit data to the network-side device over a common resource and/or a contention channel: and receive the data transmitted by the network-side device at least by one of following operations: receiving the data transmitted by the network-side device over the common resource; receiving the data transmitted by the network-side device in a paging message; or receiving the data transmitted by the network-side device at a Discrete Reception (DRX) periodicity in the new active state.

Optionally, the processor 401 is further configured: after the data are transmitted to the network-side device over the common resource and/or the contention channel, to transmit the data to the network-side device over the common resource and/or the contention channel again upon determining that the number of retransmissions does not reach a threshold; or to monitor a feedback channel after waiting for a preset length of time, and to transmit the data to the network-side device over the common resource and/or the contention channel again upon determining that the network-side device has failed to receive the data.

As illustrated in FIG. 4, a bus architecture (represented by a bus 400) can include any number of interconnecting buses and bridges to particularly link together various circuits including one or more processors represented by the processor 401, and one or more memories represented by the memory 404. The bus 400 can further link together various other circuits, e.g., a peripheral device, a manostat, a power management circuit, etc., all of which are well known in the art, so a further description thereof will be omitted in this context. A bus interface 403 serves as an interface between the bus 400 and the transceiver 402. The transceiver 402 can be an element, or a number of elements, e.g., a number of transmitters and receivers, which are units for communication with various other devices over a transmission medium. For example, the transceiver 402 receives external data from another device. The transceiver 402 is configured to transmit data processed by the processor 401 to the other device. A user interface 405. e.g., a keypad, a display, a loudspeaker, a microphone, a joystick, etc., can be further provided dependent upon the nature of a computing system.

The processor 401 is responsible for managing the bus 400 and performing normal processes, for example, running the general operating system. The memory 404 can store data for use by the processor 401 in performing the operations.

Optionally, the processor 401 can be a Central Processing Unit (CPU), an Application Specific Integrated Circuit (ASIC), a Field-Programmable Gate Array (FPGA), or a Complex Programmable Logic Device (CPLD).

Figure 5:
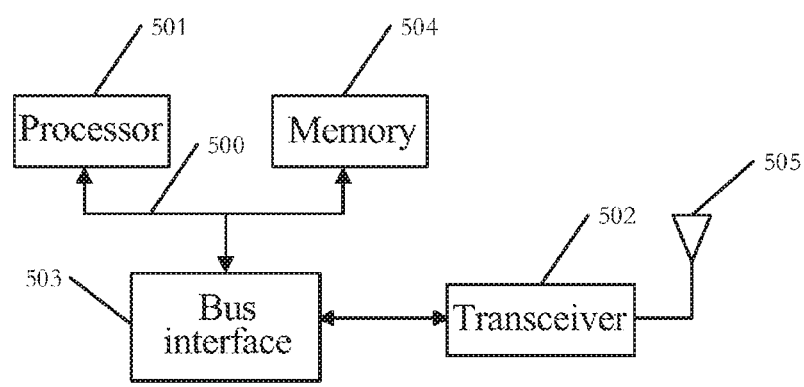
FIG. 5 is a schematic structural diagram of a second network-side device according to the embodiments of the invention.

As illustrated in FIG. 5, a second network-side device according to the embodiments of the invention includes following components.

A processor 501, configured to read programs in a memory 504 to: configure a UE into a new active state upon determining that the UE needs to enter the new active state, where the UE in the new active state moves to a new cell through cell reselection: and transmit data with the UE in the new active state through a transceiver 502.

The transceiver 502, configured to receive and transmit the data under the control of the processor 501.

Optionally, the processor 501 is further configured to: configure the UE with a UE identifier in the new active state;

and transmit the data with the UE in the new active state according to the UE identifier.

Optionally, the processor 501 is further configured to: configure the UE into the new active state upon determining that the UE has moved out of an active area in the new active state.

Optionally, the processor 501 is configured to: determine that the UE has moved out of the active area in the new active state upon reception of a UE identifier of the UE lastly operating in the new active state in a random access procedure with the UE; and obtain a context of the UE according to the UE identifier of the UE lastly operating in the new active state, and configure the UE into the new active state according to the context of the UE.

Optionally, the processor 501 is further configured to configure the UE with the active area in the new active state.

Optionally, the active area is controlled by a plurality of network-side devices: and the processor 501 is further configured to: notify the other network-side devices in the active area of the UE identifier of the network-side device in the new active state, and/or a route of the UE.

Optionally, the processor 501 is further configured to: configure the UE into the new active state upon determining that the UE is an inactive UE.

Optionally, the processor 501 is configured to: receive data transmitted by the UE over a common resource and/or a contention channel: and transmit the data to the UE at least by one of following operations: transmitting the data to the UE over the common resource: transmitting the data to the UE in a paging message; or transmitting the data to the UE at a DRX periodicity in the new active state.

Optionally, the processor 501 is further configured: if the data transmitted by the UE is received over the common resource, to configure the UE with the common resource: and/or if the data are transmitted to the UE at the DRX periodicity in the new active state, to configure the UE with the DRX periodicity in the new active state.

As illustrated in FIG. 5, a bus architecture (represented by a bus 500) can include any number of interconnecting buses and bridges to particularly link together various circuits including one or more processors represented by the processor 501, and one or more memories represented by the memory 504. The bus 500 can further link together various other circuits, e.g., a peripheral device, a manostat, a power management circuit, etc., all of which are well known in the art, so a further description thereof will be omitted in this context. A bus interface 503 serves as an interface between the bus 500 and the transceiver 502. The transceiver 502 can be an element, or a number of elements, e.g., a number of transmitters and receivers, which are units for communication with various other devices over a transmission medium. Data processed by the processor 501 are transmitted over a wireless medium through an antenna 505, and furthermore the antenna 505 further receives data and transmits the data to the processor 501.

The processor 501 is responsible for managing the bus 500 and performing normal processes, and can further provide various functions including timing, a peripheral interface, voltage regulation, power source management, and other control functions. The memory 504 can store data for use by the processor 501 in performing the operations.

Optionally, the processor 501 can be a CPU, an ASIC, an FPGA, or a CPLD.

Based upon the same inventive idea, the embodiments of the invention further provide a method for transmitting data, and since a device corresponding to this method is the UE in the system for transmitting data according to the embodiments of the invention, and this method addresses the problem under a similar principle to the device, reference can be made to the implementation of the device for an implementation of this method, and a repeated description thereof will be omitted here.

Figure 6:
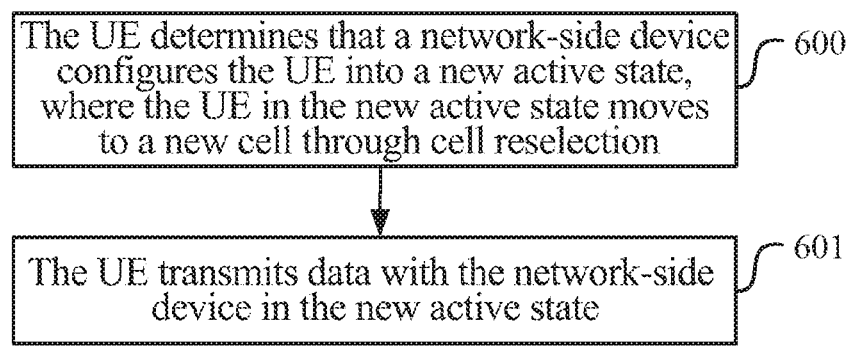
FIG. 6 is a schematic flow chart of a first method for transmitting data according to the embodiments of the invention.

As illustrated in FIG. 6, a first method for transmitting data according to at least one embodiment of the invention includes the following operations.

In the operation 600, a UE determines that a network-side device configures the UE into a new active state, where the UE in the new active state moves to a new cell through cell reselection.

In the operation 601, the UE transmits data with the network-side device in the new active state.

Optionally, the UE transmits the data with the network-side device in the new active state as follows: the UE transmits the data with the network-side device in the new active state according to a UE identifier in the new active state configured by the network-side device.

Optionally, the UE transmits the data with the network-side device in the new active state as follows: the UE transmits the data with the network-side device in the new active state in an active area of the new active state.

Optionally, after the UE determines that the network-side device configures the UE into the new active state, the method further includes: the UE initiates a random access procedure after the UE moves out of the active area, and transmits the UE identifier to the currently accessed network-side device in the random access procedure, so that the currently accessed network-side device configures the UE into the new active state.

Optionally, the UE transmits the data with the network-side device in the new active state as follows: the UE transmits the data to the network-side device over a common resource and/or a contention channel: and the UE receives data transmitted by the network-side device at least by one of following operations: the UE receives the data transmitted by the network-side device over the common resource; the UE receives the data transmitted by the network-side device in a paging message; or the UE receives the data transmitted by the network-side device at a Discrete Reception (DRX) periodicity in the new active state.

Optionally, after the UE transmits the data to the network-side device over the common resource and/or the contention channel, the method further includes: the UE transmits the data to the network-side device over the common resource and/or the contention channel again upon determining that the number of retransmissions does not reach a threshold: or the UE monitors a feedback channel after waiting for a preset length of time, and transmits the data to the network-side device over the common resource and/or the contention channel again upon determining that the network-side device has failed to receive the data.

Based upon the same inventive idea, the embodiments of the invention further provide a method for transmitting data, and since a device corresponding to this method is the network-side device in the system for transmitting data according to the embodiments of the invention, and this method addresses the problem under a similar principle to the device, reference can be made to the implementation of the device for an implementation of this method, and a repeated description thereof will be omitted here.

Figure 7:
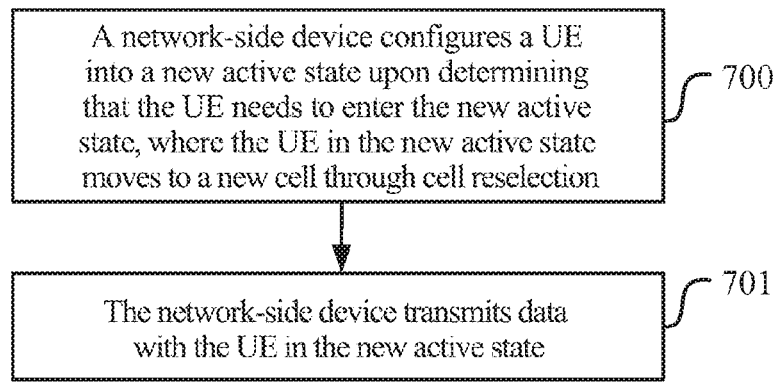
FIG. 7 is a schematic flow chart of a second method for transmitting data according to the embodiments of the invention.

As illustrated in FIG. 7, a second method for transmitting data according to the embodiments of the invention includes the following operations.

In the operation 700, a network-side device configures a UE into a new active state upon determining that the UE needs to enter the new active state, where the UE in the new active state moves to a new cell through cell reselection.

In the operation 701, the network-side device transmits data with the UE in the new active state.

Optionally, the network-side device configures the UE into the new active state as follows: the network-side device configures the UE with a UE identifier in the new active state; and the network-side device transmits the data with the UE in the new active state as follows: the network-side device transmits the data with the UE in the new active state according to the UE identifier.

Optionally, before the network-side device configures the UE into the new active state, the method further includes: the network-side device determines that the UE has moved out of an active area in the new active state.

Optionally, the network-side device determines that the UE has moved out of the active area in the new active state: the network-side device determines that the UE has moved out of the active area in the new active state upon reception of a UE identifier of the UE lastly operating in the new active state in a random access procedure with the UE; and the network-side device configures the UE into the new active state as follows: the network-side device obtains a context of the UE according to the UE identifier of the UE lastly operating in the new active state; and the network-side device configures the UE into the new active state according to the context of the UE.

Optionally, the network-side device configures the UE into the new active state as follows: the network-side device configures the UE with the active area in the new active state.

Optionally, the active area is controlled by a plurality of network-side devices; and after the network-side device configures the UE into the new active state, the method further includes: the network-side device notifies the other network-side devices in the active area of the UE identifier of the network-side device in the new active state, and/or a route of the UE.

Optionally, before the network-side device configures the UE into the new active state, the method further includes: the network-side device determines that the UE is an inactive UE.

Optionally, the network-side device transmits data with the UE in the new active state includes: the network-side device receives the data transmitted by the UE over a common resource and/or a contention channel; and the network-side device transmits the data to the UE at least by one of following operations: the network-side device transmits the data to the UE over the common resource; the network-side device transmits the data to the UE in a paging message; or the network-side device transmits the data to the UE at a DRX periodicity in the new active state.

Optionally, the network-side device configures the UE into the new active state as follows: if the data transmitted by the UE is received over the common resource, then the network-side device will configure the UE with the common resource; and/or if the data are transmitted to the UE at the DRX periodicity in the new active state, then the network-side device will configure the UE with the DRX periodicity in the new active state.

The solution according to the invention will be described below in connection with several embodiments thereof.

Figure 8:
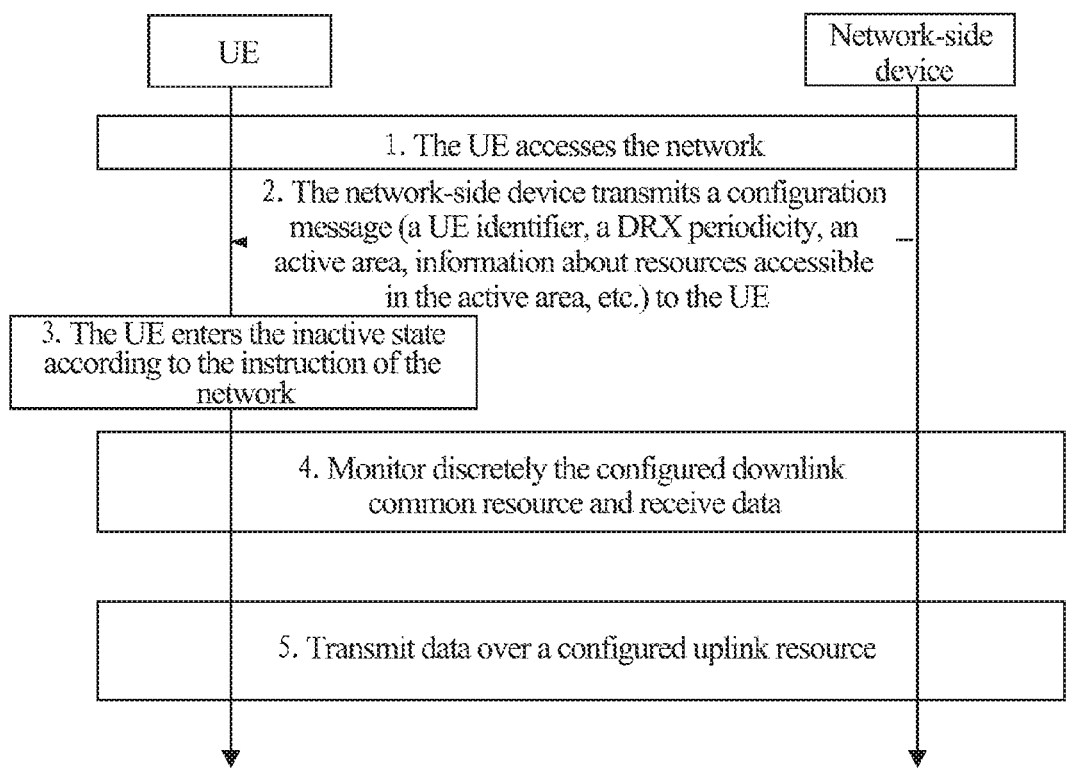
FIG. 8 is a schematic flow chart of a method for transmitting data over a common resource according to the embodiments of the invention.

In a first embodiment, as illustrated in FIG. 8, data are transmitted over a common resource as described in the embodiment of the invention, particularly as follows.

For example, a UE is an infrequent data UE (e.g., an Narrow Band Internet of Things, NB IOT, UE), and a fifth generation, 5G, network makes the UE operate in an inactive state (i.e., a new active state) according to a type of the UE.

A method for transmitting data over a common resource according to the embodiment of the invention includes the following operations.

1. A UE accesses a network.
2. The network transmits a configuration message to the UE.
3. The UE enters an inactive state according to an instruction of the network.
4. The UE monitors discretely a configured downlink common resource and receives data.
5. The UE transmits the data over a configured uplink resource.

Information transmitted by the network to the UE includes an identifier of the UE, and the identifier is composed of a CU Identifier (ID) plus a UE Temporary (TEMP) ID. And a dedicated scheduling identifier can be further configured, and the UE can be configured with a long DRX periodicity (e.g., half an hour), and an active area of the UE, which can include one cell or a list of cells, and a common resource pool in each cell, where the common resource pool can alternatively be shared by a plurality of cells, and the common resource pool includes an uplink resource and a downlink resource.

After the UE enters the inactive state, the UE receives downlink data in a DRX mode configured by the network, and if the network side has downlink data to be transmitted, then the data will be transmitted in the active area configured for the UE. In order to guarantee reliability, the data can be retransmitted. If the UE has small data to be uploaded, then the data will be transmitted over an uplink resource selected randomly in the common resource pool configured by the network for the UE.

Figure 9:
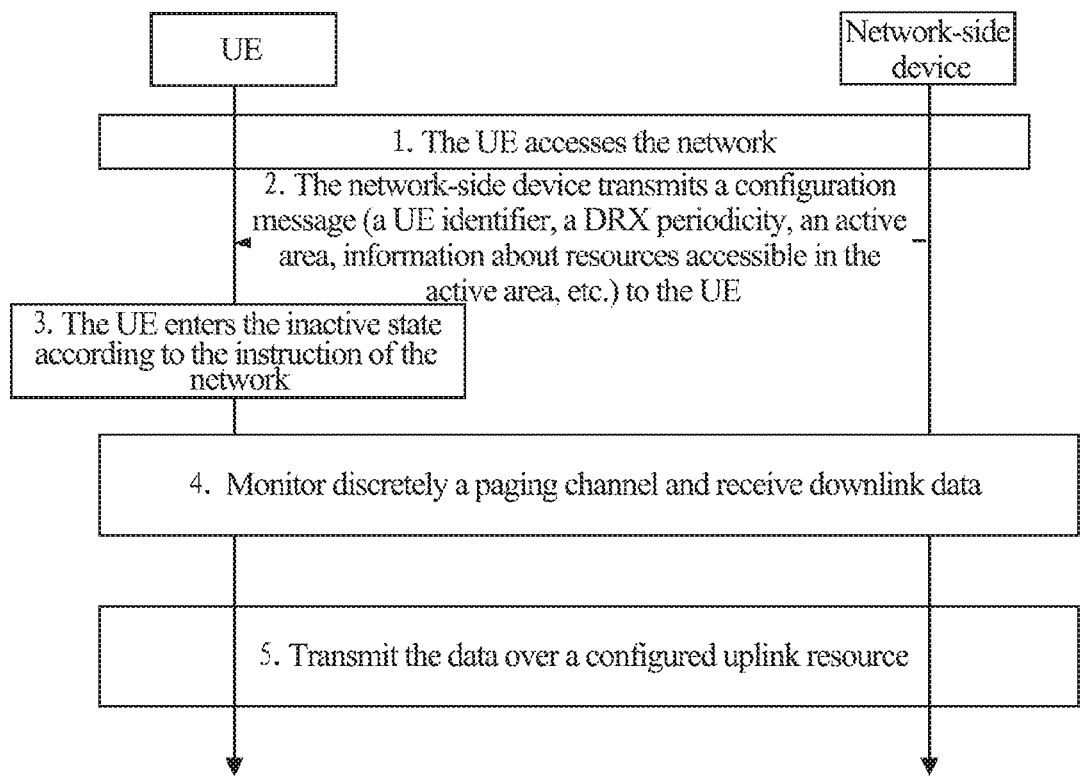
FIG. 9 is a schematic flow chart of a method for transmitting data over a paging channel according to the embodiments of the invention.

In a second embodiment, as illustrated in FIG. 9, data are transmitted over a paging channel as described in the embodiment of the invention, particularly as follows.

For example, general traffic of a UE is traffic like WeChat or other OTT traffic with a traffic characteristic of infrequent small data, and such traffic is not required to be highly real-time, that is, a long delay is allowed. A network can configure the UE into an inactive state to thereby lower a signaling overhead.

A method for transmitting data over a paging channel according to the embodiment of the invention includes the following operations.

1. A UE accesses a network.
2. The network transmits a configuration message to the UE.
3. The UE enters an inactive state according to an instruction of the network.
4. The UE monitors discretely a paging channel and receives downlink data.
5. The UE transmits the data over a configured uplink resource.

Information transmitted by the network to the UE includes an identifier of the UE, and the identifier is configured by a central control unit of a 5G system and the UE is configured with an appropriate DRX periodicity, and an active area of the UE, which can include one cell or a list of cells, where a resource for transmitting uplink data in each cell is also configured.

After the UE enters the inactive state, the UE receives downlink data in a DRX mode configured by the network, and for example, monitors the paging channel in the DRX mode, and if the network side has downlink data to be transmitted, then a paging message carrying the data will be transmitted in the active area configured for the UE. The UE receives the paging message and extracts the downlink data from the paging message. If the UE has small data to be transmitted, then the data will be transmitted over an uplink resource configured by the network.

In a third embodiment: for example, the UE in the first or the second embodiment moves in an area preconfigured by the network, and a serving cell is changed through cell reselection without notifying the network, and without reporting any measurement result. When the UE moves out of the area preconfigured by the network, the UE initiates an access procedure, enters an active state, and reports an identifier of the UE. The network side searches for a context of the UE according to the identifier of the UE, and stores the context, and can configure the UE into an inactive state according to an attribute or a traffic characteristic of the UE.

Subsequently the process in the first or second embodiment is repeated.

In a fourth embodiment: the UE enters an inactive state as configured by the network; where a UE identifier of the UE in the inactive state, an uplink and downlink resource pool, etc. are configured.

When the UE has uplink data to be transmitted, a corresponding uplink resource for transmitting the data can be selected from the resource pool under some rule. e.g., according to the identifier of the UE, or an uplink resource for transmitting the data can be selected randomly. If there is no feedback channel, then the UE may transmit the data repeatedly, e.g., twice or more. If there is a feedback channel, then the network side will feed back Acknowledgement (ACK)/Negative Acknowledgement (NACK) over a feedback channel corresponding to an uplink channel accessed by the UE. If the UE receives the NACK, then it will reselect an uplink resource and retransmit the data, and return to a reception mode of DRX upon reception of the ACK.

In a fifth embodiment: as in the third embodiment, when the UE moves out of the preconfigured area, and updates its position to the network, if a node of the network is updated, then a newly accessing node may obtain an identifier of an original network-side device according to a UE identifier reported by the UE, and obtain a context of the UE from the original network-side device. Also a route of the network is updated, and the connection is transferred to the new network-side device. The new network node stores the context of the UE, and instructs the original network-side device to release information about the UE.

If the newly accessing node fails to obtain the context of the UE from the original network-side device, then it may reestablish a new connection for the UE, or reject the UE so that the UE initiates an establishment procedure again. The newly accessing node may alternatively transmit an original UE identifier of the UE to an Operation, Administration, and Maintenance (OAM) entity so that the OAM entity maintains and releases subscriber information of the original network-side device.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a processor of a general-purpose computer or a specific-purpose computer, and/or another programmable data processing device to produce a machine so that the instructions executed on the processor of the computer, and/or the other programmable data processing device create means for performing the functions/actions specified in the flow(s) of the flow chart and/or the block(s) of the block diagram.

Correspondingly the invention can be further embodied in hardware and/or software (including firmware, resident software, micro-codes, etc.). Still furthermore the invention can be embodied in the form of a computer program product on a computer useable or readable storage medium, where the computer program product includes computer useable or readable program codes embodied in the medium to be used by or in connection with an instruction executing system. In the context of the invention, the computer useable or readable medium can be any medium which can include, store, communicate, transmit, or transport program to be used by or in connection with an instruction executing system, apparatus or device.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting data, the method comprising:
determining, by a User Equipment (UE) that a network-side device configures the UE into a new active state, wherein the UE in the new active state moves to a new cell through cell reselection; and transmitting, by the UE, data with the network-side device in the new active state; wherein after the UE determines that the network-side device configures the UE into the new active state, the method further comprises: initiating, by the UE, a random access procedure after the UE moves out of an active area of the new active state, and transmitting a UE identifier to a currently accessed network-side device in the random access procedure, so that the currently accessed network-side device configures the UE into the new active state, and
wherein configuring, by the network-side device, the UE into the new active state comprises: obtaining, by the network-side device, a context of the UE according to the UE identifier of the UE lastly operating in the new active state; and configuring, by the network-side device, the UE into the new active state according to the context of the UE.

2. The method according to claim 1, wherein transmitting, by the UE, the data with the network-side device in the new active state comprises: transmitting, by the UE, the data with the network-side device in the new active state according to the UE identifier in the new active state configured by the network-side device.

3. The method according to claim 2, wherein transmitting, by the UE, the data with the network-side device in the new active state comprises: transmitting, by the UE, the data with the network-side device in the new active state in the active area of the new active state.

4. The method according to claim 1, wherein transmitting, by the UE, the data with the network-side device in the new active state comprises:
transmitting, by the UE, the data to the network-side device over a common resource and/or a contention channel; and receiving, by the UE, data transmitted by the network-side device at least by one of following operations: receiving, by the UE, the data transmitted by the network-side device over the common resource; receiving, by the UE, the data transmitted by the network-side device in a paging message; or receiving, by the UE, the data transmitted by the network-side device at a Discrete Reception (DRX) periodicity in the new active state.

5. The method according to claim 4, wherein after the UE transmits the data to the network-side device over the common resource and/or the contention channel, the method further comprises: transmitting, by the UE, the data to the network-side device over the common resource and/or the contention channel again upon determining that a quantity of retransmissions does not reach a threshold; or monitoring, by the UE, a feedback channel after waiting for a preset length of time, and transmitting the data to the network-side device over the common resource and/or the contention channel again upon determining that the network-side device has failed to receive the data.

6. A method for transmitting data, the method comprising: configuring, by a network-side device, a User Equipment (UE) into a new active state upon determining that the UE needs to enter the new active state, wherein the UE in the new active state moves to a new cell through cell reselection; and transmitting, by the network-side device, data with the UE in the new active state, wherein before the network-side device configures the UE into the new active state, the method further comprises: determining, by the network-side device, that the UE has moved out of an active area in the new active state;
wherein determining, by the network-side device, that the UE has moved out of the active area in the new active state comprises: determining, by the network-side device, that the UE has moved out of the active area in the new active state upon reception of a UE identifier of the UE lastly operating in the new active state in a random access procedure with the UE; and wherein configuring, by the network-side device, the UE into the new active state comprises: obtaining, by the network-side device, a context of the UE according to the UE identifier of the UE lastly operating in the new active state; and configuring, by the network-side device, the UE into the new active state according to the context of the UE.

7. The method according to claim 6, wherein configuring, by the network-side device, the UE into the new active state comprises: configuring, by the network-side device, the UE with the UE identifier in the new active state; and transmitting, by the network-side device, the data with the UE in the new active state comprises: transmitting, by the network-side device, the data with the UE in the new active state according to the UE identifier.

8. The method according to claim 7, wherein configuring, by the network-side device, the UE into the new active state further comprises: configuring, by the network-side device, the UE with the active area in the new active state.

9. The method according to claim 7, wherein the active area is controlled by a plurality of network-side devices; and after the network-side device configures the UE into the new active state, the method further comprises: notifying, by the network-side device, the other network-side devices in the active area of the UE identifier of the UE in the new active state, and/or a route of the UE.

10. The method according to claim 6, wherein before the network-side device configures the UE into the new active state, the method further comprises: determining, by the network-side device, that the UE is an inactive UE.

11. The method according to claim 6, wherein transmitting, by the network-side device, the data with the UE in the new active state comprises: receiving, by the network-side device, data transmitted by the UE over a common resource and/or a contention channel; and transmitting, by the network-side device, the data to the UE at least by one of following operations: transmitting, by the network-side device, the data to the UE over the common resource; transmitting, by the network-side device, the data to the UE in a paging message; or transmitting, by the network-side device, the data to the UE at a Discrete Reception (DRX) periodicity in the new active state.

12. The method according to claim 11, wherein configuring, by the network-side device, the UE into the new active state further comprises: if the network-side device receives the data transmitted by the UE over the common resource, then configuring, by the network-side device, the UE with the common resource; and/or if the network-side device transmits the data to the UE at the DRX periodicity in the new active state, then configuring, by the network-side device, the UE with the DRX periodicity in the new active state.

13. A User Equipment (UE) for transmitting data, the UE comprising at least one processor and a memory; wherein the memory is configured to store readable program codes, and the at least one processor is configured to execute the readable program codes to: determine that a network-side device configures the UE into a new active state, wherein the UE in the new active state moves to a new cell through cell reselection; and transmit data with the network-side device in the new active state; and wherein the at least one processor is configured to execute the readable program codes to: initiate a random access procedure after the UE moves out of an active area of the new active state, and transmit a UE identifier to a currently accessed network-side device in the random access procedure, so that the currently accessed network-side device configures the UE into the new active state, and
wherein configuring, by the network-side device, the UE into the new active state comprises: obtaining, by the network-side device, a context of the UE according to the UE identifier of the UE lastly operating in the new active state; and configuring, by the network-side device, the UE into the new active state according to the context of the UE.

14. The UE according to claim 13, wherein the at least one processor is configured to execute the readable program codes to: transmit the data with the network-side device in the new active state according to the UE identifier in the new active state configured by the network-side device; or transmit the data with the network-side device in the new active state in the active area of the new active state.

15. The UE according to claim 13, wherein the at least one processor is configured to execute the readable program codes to:
transmit data to the network-side device over a common resource and/or a contention channel; and receive data transmitted by the network-side device at least by one of following operations: receiving the data transmitted by the network-side device over the common resource; receiving the data transmitted by the network-side device in a paging message; or
receiving the data transmitted by the network-side device at a Discrete Reception (DRX) periodicity in the new active state.

16. The UE according to claim 15, wherein the at least one processor is configured to execute the readable program codes to: after the data are transmitted to the network-side device over the common resource and/or the contention channel, transmit the data to the network-side device over the common resource and/or the contention channel again upon determining that a quantity of retransmissions does not reach a threshold; or monitor a feedback channel after waiting for a preset length of time, and transmit the data to the network-side device over the common resource and/or the contention channel again upon determining that the network-side device has failed to receive the data.

* * * * *